United States Patent [19]
Gold et al.

[11] Patent Number: 5,553,812
[45] Date of Patent: Sep. 10, 1996

[54] INERTIAL VELOCITY COMMAND SYSTEM

[75] Inventors: Phillip J. Gold, Shelton; Donald L. Fogler, Jr., Milford, both of Conn.; James B. Dryfoos, Wallingford, Pa.

[73] Assignee: United Technologies Corporation, Hartford, Conn.

[21] Appl. No.: 253,477

[22] Filed: Jun. 3, 1994

[51] Int. Cl.⁶ .............. B64C 11/34; G05D 1/08; G05D 1/10
[52] U.S. Cl. .............. 244/76 R; 244/17.13; 244/178; 244/181; 244/195; 364/434; 364/453
[58] Field of Search .............. 244/76 R, 17.13, 244/175, 178, 181, 182, 191, 195, 228; 364/443, 453, 432, 434

[56] References Cited

U.S. PATENT DOCUMENTS

| | | | |
|---|---|---|---|
| 3,995,144 | 11/1976 | Johnson et al. | 235/61.5 E |
| 4,032,759 | 6/1977 | Danik | 235/150.25 |
| 4,070,674 | 1/1978 | Buell et al. | 364/453 |
| 4,106,094 | 8/1978 | Land | 364/453 |
| 4,173,784 | 11/1979 | Heath et al. | 364/453 |
| 4,232,313 | 11/1980 | Fleishman | 364/453 |
| 4,645,141 | 2/1987 | McElreath | 244/17.13 |
| 4,924,400 | 5/1990 | Post et al. | 364/433 |
| 5,001,646 | 3/1991 | Caldwell et al. | 364/434 |
| 5,008,825 | 4/1991 | Nadkarni et al. | 364/434 |
| 5,195,700 | 3/1993 | Fogler, Jr. et al. | 244/17.21 |
| 5,238,203 | 8/1993 | Skonieczny et al. | 364/434 |

Primary Examiner—Andres Kashnikow
Assistant Examiner—Virna Lissi Mojica
Attorney, Agent, or Firm—Michael Grillo

[57] ABSTRACT

A velocity command system is provided with a velocity stabilization mode wherein aircraft flight path referenced velocities are determined with respect to an inertial frame of reference, the flight path referenced velocities are held constant during pilot commanded yaw maneuvers so that the aircraft maintains a fixed inertial referenced flight path regardless of the pointing direction of the aircraft. Velocity control with respect to an inertial frame of reference is accomplished by controlling the aircraft flight path based on aircraft body referenced commanded lateral and longitudinal acceleration and based on aircraft body referenced lateral and longitudinal centrifugal acceleration. Operation in the velocity stabilization mode is provided in response to the manual activation of the velocity stabilization mode by the pilot, provided that the aircraft is already operating in the ground speed mode and the aircraft is not in a coordinated turn.

12 Claims, 5 Drawing Sheets

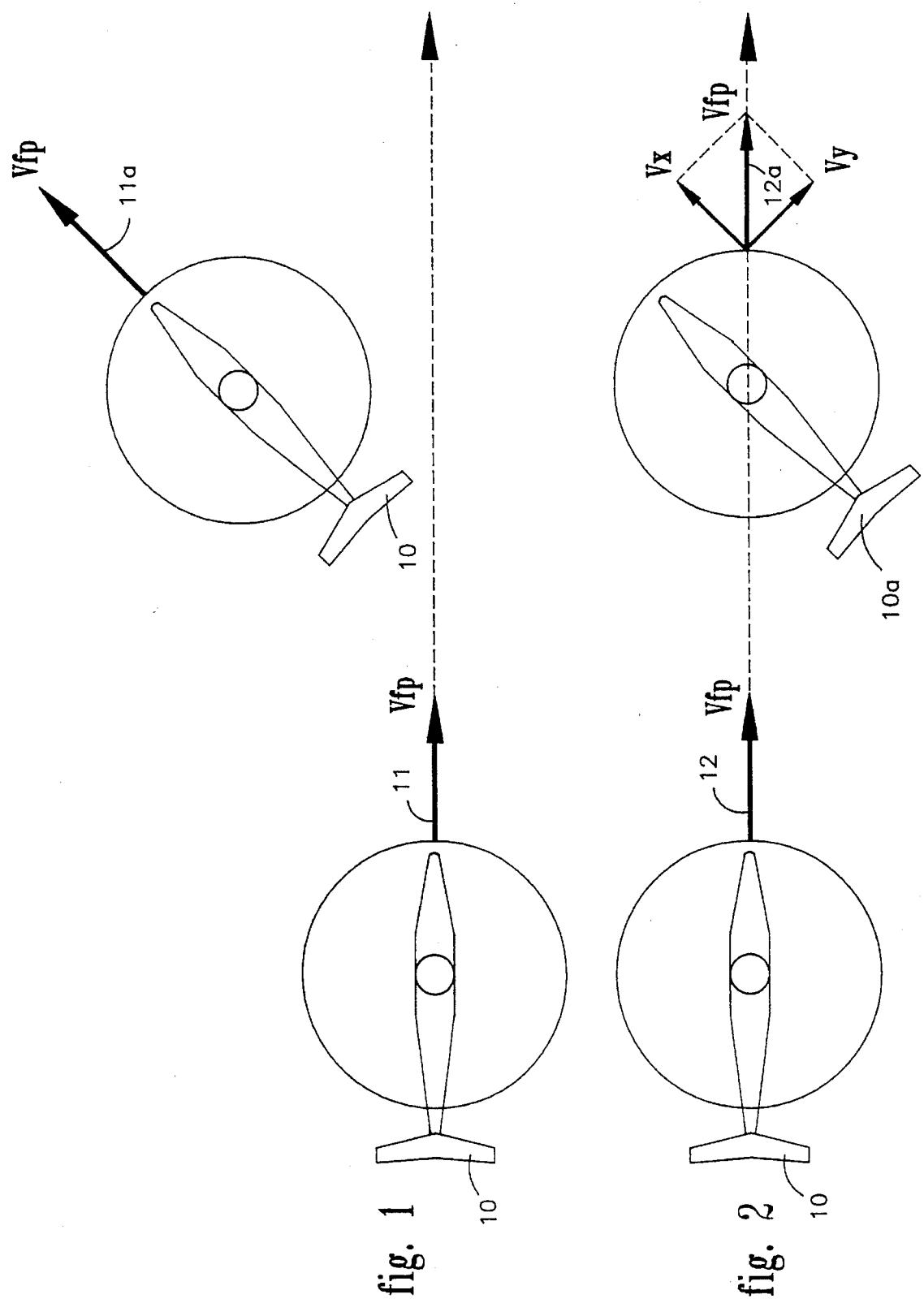

5,553,812

INERTIAL VELOCITY COMMAND SYSTEM

The Government has rights in this invention pursuant to Contract No. DAAJ09-91-C-A004 awarded by the Department of the Army.

TECHNICAL FIELD

The present invention relates to aircraft velocity command systems, and more particularly to a velocity command system having an inertial reference which allows a pilot to yaw the aircraft during operation in a velocity stabilization mode without changing the flight path of the aircraft with respect to the inertial reference.

BACKGROUND OF THE INVENTION

In automatic flight control systems, it is well known to provide a velocity stabilization mode (velocity hold mode) wherein the automatic flight control system maintains the aircraft's body referenced velocities constant during operation in the velocity hold mode. This is particularly useful in a variety of aircraft operating conditions to reduce the pilot workload, maximize fuel efficiency, maintain aircraft position with respect to a mission flight plan, and for a variety of other purposes.

During operation in a velocity hold mode, there are a number of situations wherein a pilot may desire to yaw or turn the aircraft while maintaining the velocity hold mode. For example, the pilot may wish to yaw the aircraft to perform a sensor sweep, or for weapons firing. However, during operation in an aircraft body referenced velocity hold mode, the aircraft flight path will change in response to a pilot yaw input. This is illustrated in FIG. 1 wherein an aircraft 10 maintains a constant body referenced velocity both before 11 and after 11a a yaw maneuver, and therefore assumes a new flight path after the maneuver. During certain aircraft operations, and particularly during nap of the earth flight operations wherein the aircraft maintains an altitude close to the ground, a change in aircraft flight path in response to a yaw input may be undesirable. This is true when there are obstacles, e.g.,, buildings, trees, mountains etc., on either side of the flight path which the aircraft may encounter on the change in flight path.

DISCLOSURE OF INVENTION

Objects of the invention include provision of an improved aircraft velocity command system having an inertial frame of reference.

Another object of the present invention is to provide an aircraft velocity command system which allows the pilot, during operation in a velocity stabilization mode, to yaw the aircraft from side to side without changing the inertial flight path of the aircraft.

According to the present invention, a velocity command system is provided with a velocity stabilization mode wherein aircraft flight path referenced velocities are determined with respect to an inertial frame of reference, the flight path referenced velocities are held constant during pilot commanded yaw maneuvers so that the aircraft maintains a fixed inertial referenced flight path regardless of the pointing direction of the aircraft.

In further accord with the present invention, velocity control with respect to an inertial frame of reference is accomplished by controlling the aircraft flight path based on aircraft body referenced commanded lateral and longitudinal acceleration and based on aircraft body referenced lateral and longitudinal centrifugal acceleration.

In still further accord with the present invention, operation in the velocity stabilization mode is provided in response to the manual activation of the velocity stabilization mode by the pilot, provided that the aircraft is already operating in the ground speed mode and the aircraft is not in a coordinated turn.

The inertial referenced velocity command system of the present invention allows a pilot to yaw the aircraft nose from side to side during operation in the velocity stabilization mode without changing the flight path of the aircraft with respect to an inertial frame of reference. Therefore, during restricted flight path operations, such as during nap of the earth flight operations, a pilot can turn the aircraft to perform a sensor sweep or to aim weapons without changing the aircraft inertial flight path. Conventional velocity hold systems maintain aircraft body referenced velocity and do not maintain the aircraft's inertial flight path when yaw inputs are applied. It would require a significant amount of pilot workload in order to manually perform an inertial reference velocity hold task.

The foregoing and other objects, features and advantages of the present invention will become more apparent in light of the following detailed description of exemplary embodiments thereof as illustrated in the accompanying drawings.

BRIEF DESCRIPTION OF THE DRAWINGS

FIG. 1 is a diagram showing a change in vehicle flight path in response to a pilot yaw command during operation in a velocity hold mode of a vehicle having a body referenced velocity hold control system;

FIG. 2 is a diagram showing the response of a vehicle to a pilot yaw command during operation in a velocity stabilization mode, the aircraft having an inertial referenced velocity command system of the present invent)on;

BEST MODE FOR CARRYING OUT THE INVENTION

The inertial referenced velocity command system of the present invention is particularly well suited for allowing a pilot to yaw an aircraft from side to side while maintaining a specific or selected course, without changing the aircraft flight path with respect to an inertial frame of reference. Referring to FIG. 2, an aircraft 10 is shown operating in a velocity stabilization mode having a fixed velocity along a selected flight path as indicated by velocity vector 12. In response to a yaw command by a pilot during operation in a velocity stabilization mode, the aircraft 10a yaws while maintaining a constant flight path reference velocity 12a with respect to an inertial frame of reference.

The velocity command system will be described with respect to a model following flight control system for a rotary winged aircraft; however, it will be understood by those skilled in the art that the velocity stabilization control of the present invention is applicable to conventional control systems, and to both fixed and rotary winged aircraft.

Figure 3:
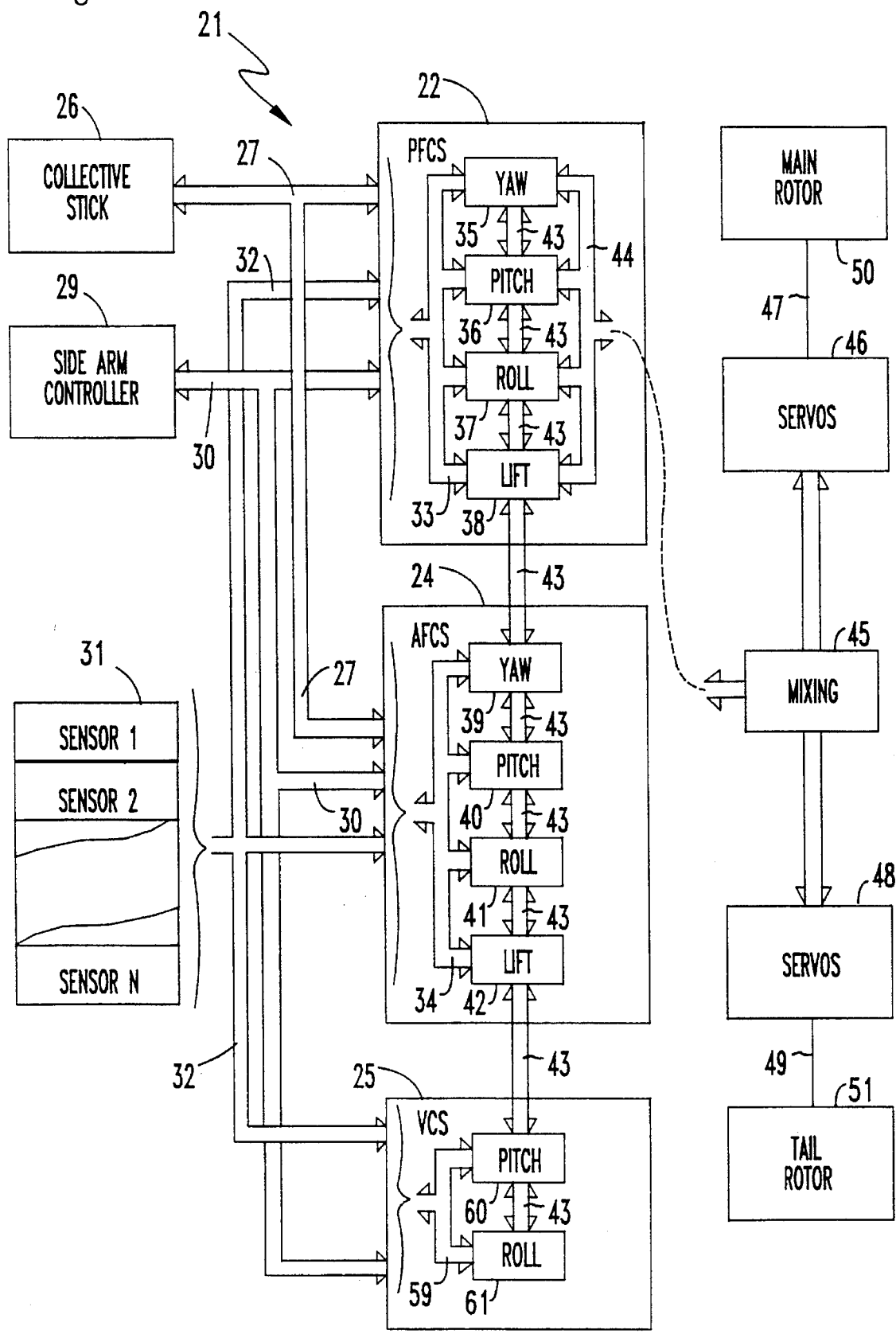
FIG. 3 is a schematic block diagram of the velocity command system of the present invention in relation to an aircraft flight control system.

Referring to FIG. 3, a flight control system 21 includes a primary flight control system (PFCS) 22, an automatic flight control system (AFCS) 24 and a velocity command system (VCS) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30 and sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35–38 for the PFCS and blocks 39–42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

The VCS 25 receives the force output command signals of the sidearm controller 29 on lines 30 and sensed parameter signals from sensors 31 on lines 32. The pilot command signals on lines 30 and the sensed parameter signals on lines 32 are shown consolidated within trunk lines 59 in the VCS.

The VCS contains control channel modules for providing pitch axis and roll axis velocity error signals to the AFCS. These modules are shown by blocks 60 and 61, respectively. The VCS modules are interconnected to the PFCS and AFCS modules through the bus 43. As described in greater detail hereinafter, during operation in the velocity stabilization mode, the VCS velocity error signals are fed back through PFCS proportional and integral paths to drive the error signals to zero.

Figure 4:
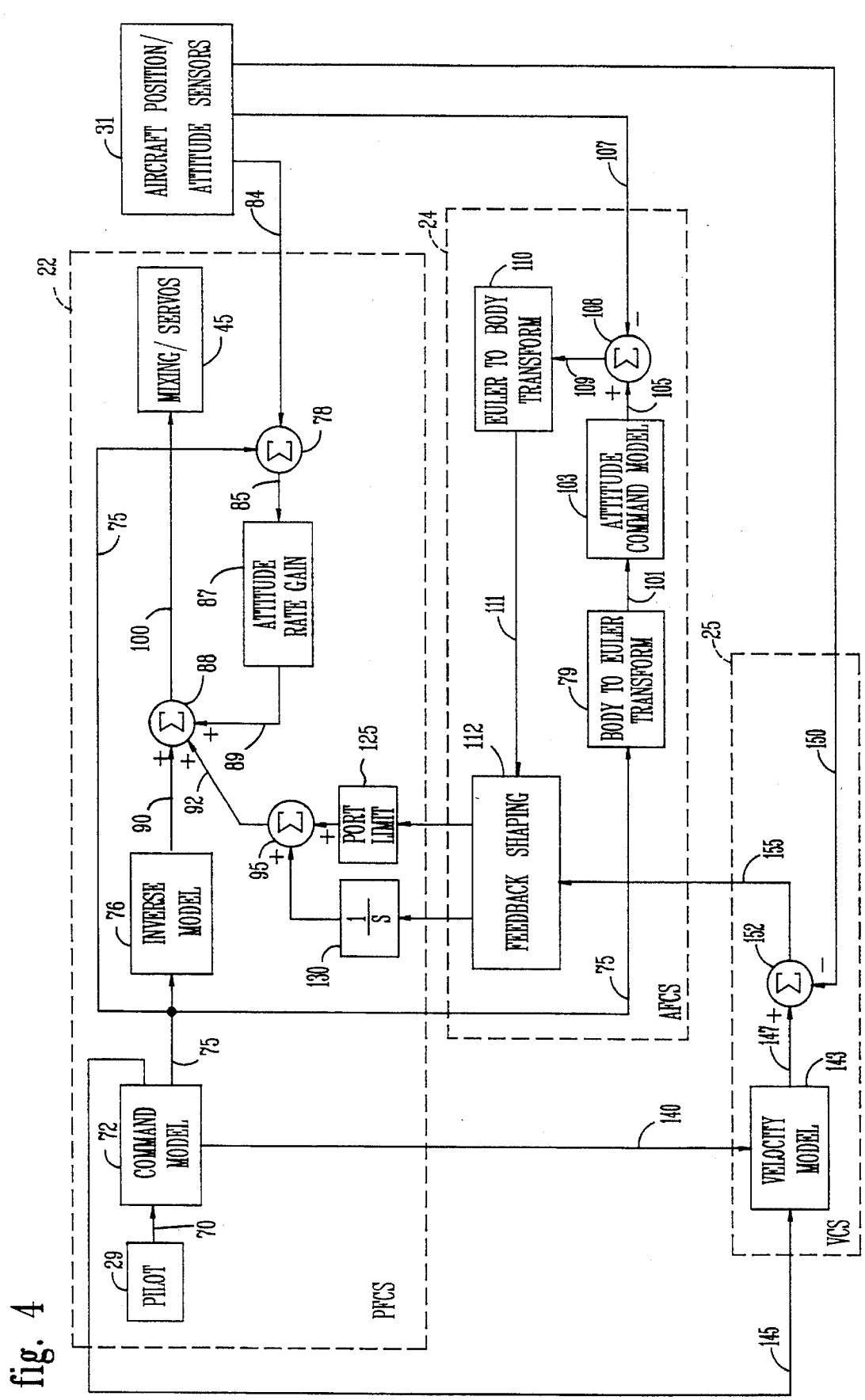
FIG. 4 is a simplified schematic block diagram of the flight control system and velocity command system of FIG. 3.

FIG. 4 illustrates the functional interconnection of the VCS 25 with the PFCS 22 and the AFCS 24. FIG. 4 will be described with respect to the pitch axis modules 36, 40, 60, e.g., flight control pitch attitude reference and VCS pitch axis velocity error signals; however, it will be understood by those skilled in the art that the functional interconnection of FIG. 4 is equally applicable to flight control roll attitude reference and VCS roll axis velocity error signals.

The PFCS receives a pitch axis command signal on line 70, provided through trunk lines 33 and lines 30, from the sidearm controller 29 (FIG. 3). In the present embodiment, the sidearm controller is a four-axis force stick in which yaw axis command signals are generated by the pilot's lateral twisting (left or right) of the sidearm controller, pitch axis command signals are generated by the pilot's pushing and pulling (front or back) of the sidearm controller, and roll axis command signals are generated by the pilot applying a left or right force to the sidearm controller. The pitch command signal is presented to the input of a pitch axis command model 72. In the command model 72, pilot commands are shaped to yield a desired rate and/or attitude response. The desired rate response is provided on a line 75 in a feedforward path to an inverse model 76 of the vehicle dynamics. The inverse model 76 provides a control command signal on a line 90 which represents the approximate rotor command necessary to achieve the desired pitch axis rate of change of the aircraft for each pilot commanded maneuver, and provides the primary control input to the rotor mixing function 45.

The desired rate response on the line 75 is also provided to a summing junction 78 in the PFCS, and to a Body to Euler Transformation 79 in the AFCS. The summing junction 78 compares the desired rate response on line 75 with the aircraft's actual pitch rate, received (from sensors 31, through lines 32 and trunk 33) as a sensed pitch rate signal on line 84. The output of the summing junction 78 is a pitch rate error signal on a line 85. The rate error signal is applied to a proportional gain function 87 (to reduce the error), the output of which is provided on a line 89 to a summing junction 88. The summing junction 88 also receives the control command signal on line 90 from the inverse model 76, and a pitch command modifying signal on a line 92 from a summing junction 95. The output of the summing junction 88 is provided on a line 100, and presented through the PFCS output trunk lines 44 to the mixing function 45.

The magnitude and rate of change of the pitch command modifying signal from the AFCS is a function of the aircraft pitch error. The pitch command modifying signal is a calculated value provided by a model following algorithm within the AFCS, based on the actual aircraft response to the rotor command signal. The pitch command modifying signal modifies the rotor command signal to achieve the pilot commanded pitch attitude. A more detailed description of the model following algorithms of the AFCS, and AFCS architecture, is given in commonly owned U.S. Pat. No. 5,238,203, entitled "High Speed Turn Coordination For A Rotary Wing Aircraft", the disclosure of which is incorporated herein by reference.

A pitch attitude feedback error signal is used to provide the pitch command modifying signal. The attitude feedback error signal is developed in the AFCS. The desired rate response is provided on the line 75 to the Body to Euler Transformation 79. The Transformation 79 transforms the desired rate response, which is in terms of aircraft body axes, to an inertial axes reference. The output of the transformation 79 is provided on a line 101 to an AFCS attitude command model 103. The attitude command model 103 is an integral function which converts the desired rate response to a desired pitch attitude signal on a line 105. The desired pitch attitude signal is provided to a summing junction 108, the other input of which is a pitch attitude signal on a line 107, provided from sensors 31, through lines 32 and trunk 34 (FIG. 3). The output of the summing junction 108 is a pitch attitude feedback error signal on a line 109 in terms of inertial axes, which is provided to a Euler to Body Transform 110 which transforms the pitch attitude feedback error signal from an inertial axes reference back to an aircraft body axes reference on a line 111. The operation of both Transform functions 79, 110 are described in greater detail in the aforementioned commonly owned U.S. Pat. No. 5,238,203, the disclosure of which is incorporated herein by reference.

The pitch attitude feedback error signal on the line 111 is applied to feedback shaping circuitry 112 and thereafter via a proportional path containing a gain function 125 to the summing junction 95. The pitch attitude feedback signal is also applied to the summing junction 95 via an integral path containing an integral function 130. The output of the summing junction 95 is the pitch command modifying signal on the line 92.

The command model 72 provides a desired attitude response signal on a line 140 to a velocity model 143 in the VCS. Additionally, the command model for the yaw axis provides a desired yaw axis rate response, i.e., desired heading rate, on a line 145 to the velocity model 143. In order to hold the flight path referenced velocities constant, centrifugal acceleration terms caused by the pilot yawing the vehicle are included in the velocity model. As described in greater detail hereinafter with respect to FIG. 5, the velocity model uses the heading rate signal on the line 145 and the desired attitude response for the pitch axis and the yaw axis to develop centrifugal acceleration terms. The acceleration terms are combined with derived pilot on-axis acceleration commands, and the result is integrated to yield a desired commanded velocity signal on a line 147. The commanded velocity signal on the line 147 is compared with ground reference velocity signals provided on a line 150 (from sensors 31 through lines 32 and trunk 33) in a summing junction 152. The output of the summing junction 152 is a velocity error signal which is fed back via the feedback shaping circuitry 122 through the proportional 125 and integral 130 paths to drive the velocity errors to zero.

The feedback shaping circuitry 112 may be of any suitable type known in the art for providing selection and/or transition between attitude feedback signals and velocity error signals as applicable. For example, when the velocity stabilization mode is not activated, the feedback shaping circuitry 112 provides the attitude feedback signals to the integral and proportional paths. However, upon activation of the velocity stabilization mode, the feedback shaping circuitry replaces the attitude feedback signals with the velocity error signals for the integral path and provides a combination of attitude feedback signals and velocity error signals to the proportional path. The above description of the feedback shaping circuitry 112 is provided for illustrative purposes only, and the circuitry will vary depending on the dynamics and characteristics of the plant being controlled. As will be apparent to those skilled in the art, transient free switching may be used to transition between attitude feedback signals and velocity error signals.

Figure 5:
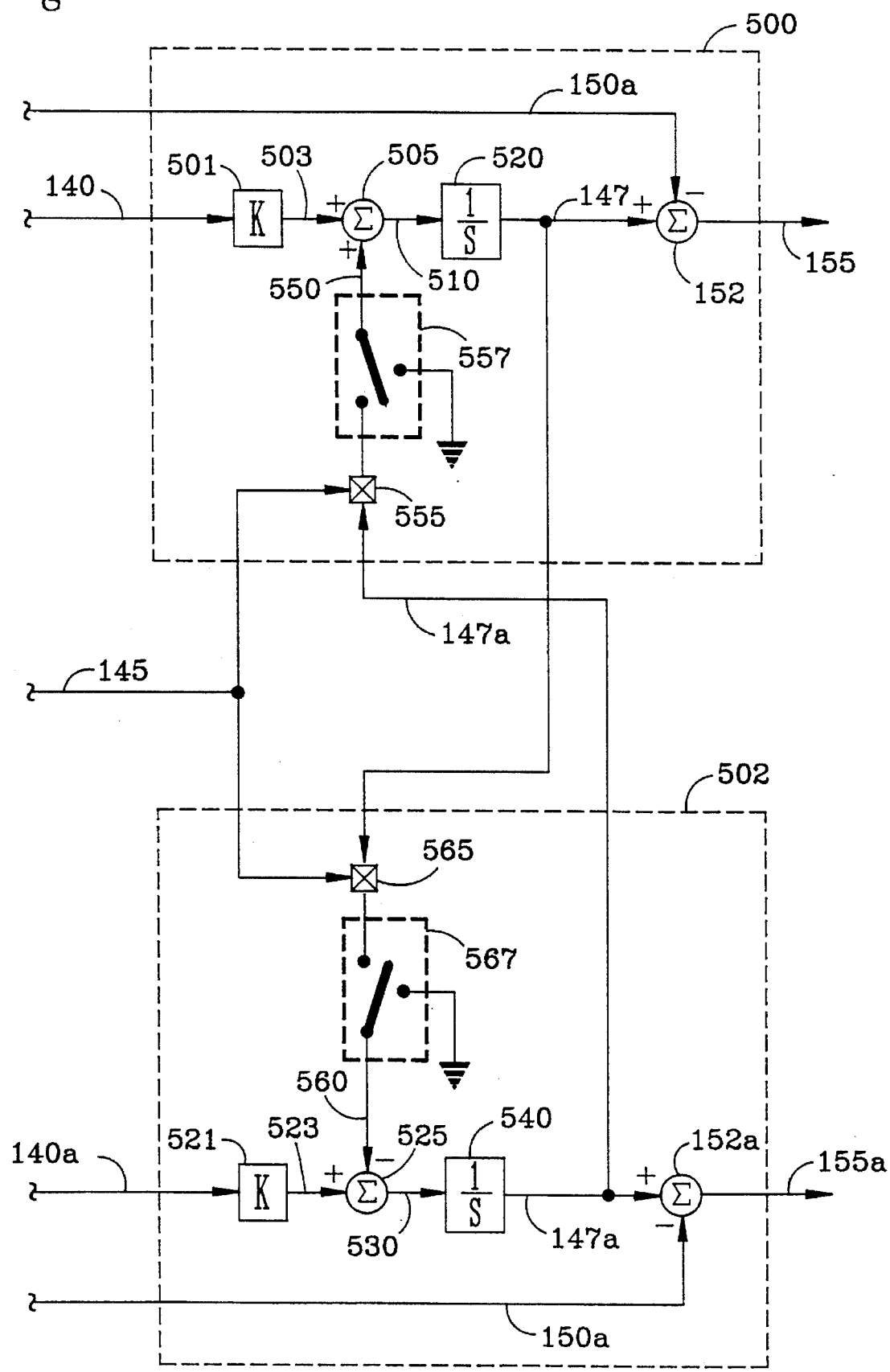
FIG. 5 is a more detailed schematic block diagram of the velocity command system of FIGS. 3 and 4.

Referring now to FIG. 5, the velocity command system 25 for the pitch axis and the roll axis are shown in greater detail. Upon activation of the velocity stabilization mode, the command model 72 (FIG. 4) provides a desired rate response 75 and a desired attitude response 140 for the pitch and roll attitude axes so that the helicopter maintains an attitude necessary to maintain a constant or fixed desired velocity. The velocity command system 25 of the present invention is operative to maintain the desired velocity constant with respect to an inertial frame of reference.

In a pitch axis module 500, the desired pitch axis attitude response is provided on a line 140 to a gain function 501 wherein the commanded attitude is multiplied by the gravitational constant, g, i.e., 9.81 m/sec² or 32.2 ft/sec². The output of the multiplication function 501 is an acceleration term provided on a line 503 to a summing junction 505. As will be understood by those skilled in the art, a pitch axis or roll axis command for a rotary wing aircraft is proportional to an acceleration command, i.e., by multiplying the axis command by the gravitational constant. For a fixed wing aircraft (or other type of vehicle) an explicit acceleration command may be used to provide the pitch axis acceleration term on the line 503.

The other input to the summing junction is a centrifugal acceleration term which will be described in greater detail hereinafter. The output of the summing junction 505 is an acceleration term which is provided on a line 510 to an integrator 520, the output of which is a desired pitch axis commanded velocity signal on the line 147. The desired commanded velocity signal is provided to the summing junction 152 the other input of which is the longitudinal ground speed signal on the line 150. The summing junction 152 compares the commanded velocity with the actual velocity, and provides as its output a pitch axis velocity error signal on the line 155 which is provided via the PFCS integral path and proportional path to drive the velocity error to zero.

The roll axis velocity error is developed in a roll axis module 502 in the same way that the pitch axis velocity error is developed. The desired roll axis attitude response is provided on a line 140a to a gain function 521 wherein the attitude command is multiplied by the gravitational constant, g. The output of the gain function 521 is provided on a line 523 to a summing junction 525. The other input to the summing junction 525 is a centrifugal acceleration term which will be described in greater detail hereinafter. The output of the summing junction 525 is provided on a line 530 to an integrator 540. The output of the integrator 540 is a desired roll axis commanded velocity signal on a line 147a which is provided to a summing junction 152a where it is compared with a lateral ground speed signal on a line 150a. The output of the summing junction 152a is a roll axis velocity error signal on a line 155a.

In order to hold the flight path (inertial) referenced velocities constant, centrifugal acceleration terms which are caused by the pilot yawing the vehicle must be included in the pitch axis and roll axis velocity models. A longitudinal centrifugal acceleration term is provided on a line 550 to the summing junction 505. The longitudinal centrifugal acceleration term is determined by a multiplication function 555 as the product of the commanded heading rate on line 145 and the desired roll axis commanded velocity signal on the line 147a. The output of the multiplication function 555 is provided via normally closed switch 557 to the summing junction 505 via the line 550. The normally closed switch 557 opens in response to the aircraft operating in the automatic turn coordination mode. The lateral centrifugal acceleration term is provided as the output of multiplication function 565 via normally closed switch 567 and line 560 to the summing junction 525. The lateral centrifugal acceleration term is determined by the multiplication function 565 as the product of the commanded heading rate on the line 140 and the desired pitch axis velocity command signal on the line 147. If the aircraft is in a coordinated turn, switches 557 and 657 are opened, and the centrifugal acceleration terms are set equal to zero.

Figure 6:
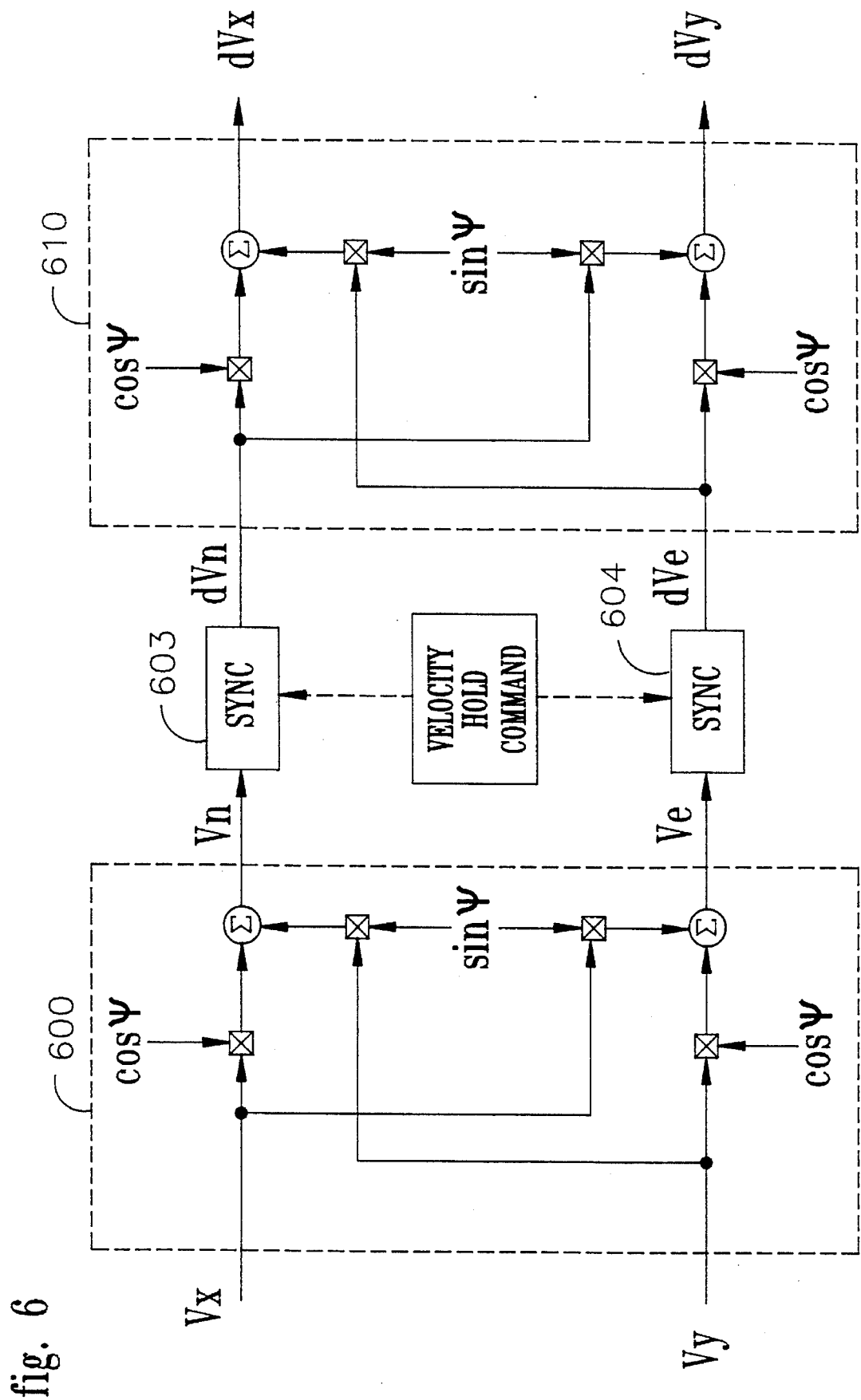
FIG. 6 is a schematic block diagram of an alternative embodiment of the velocity command system of FIG. 5.

The velocity stabilization described thus far is applicable to an aircraft flight control system implemented using model following algorithms. However, the inertial reference velocity command system of the present invention may be implemented in a conventional flight control system using the simplified coordinate system transformations illustrated in FIG. 6. Referring to FIG. 6, aircraft body reference velocities (velocity vectors Vx and Vy) are converted to inertial reference velocities (velocity vectors Vn and Ve) using a body to inertial transformation function 600. The body to inertial transformation 600 uses equations 1 and 2 below to transform body referenced velocities to inertial referenced velocities:

$$V_n = V_x \cos(\Psi) - V_y \sin(\Psi) \quad \text{(eq. 1)}$$

$$V_e = V_x \sin(\Psi) - V_y \cos(\Psi) \quad \text{(eq. 2)}$$

wherein Vn is aircraft inertial referenced longitudinal velocity, e.g., in the North/South direction; Ve is aircraft inertial referenced lateral velocity, e.g., in the East/West direction; Vx is aircraft body referenced longitudinal velocity; Vy is aircraft body referenced lateral velocity; and $\Psi$ is vehicle heading.

Upon activation of the inertial reference velocity synchronization mode, synchronization functions 603 and 604 store the instantaneous values of the inertial referenced velocity vectors. During operation in the inertial referenced velocity synchronization mode, the synchronization functions 603 and 604 compare the aircraft's actual inertial referenced velocity to the stored inertial referenced velocity values to develop inertial referenced velocity error signals, dVn and dVe. Thereafter, the inertial referenced velocity error signals are provided to an inertial to body transformation function 610 which converts the error signals from an inertial reference back to a body reference. The inertial to body transformation function 610 uses equations 3 and 4 below;

$$dV_x = dV_n \cos(\Psi) + dV_e \sin(\Psi) \quad \text{(eq. 3)}$$

$$dV_y = -dV_n \sin(\Psi) + dV_e \cos(\Psi) \quad \text{(eq. 4)}$$

wherein dVn is aircraft inertial referenced longitudinal velocity error; dVe is aircraft inertial referenced lateral velocity error; dVx is aircraft body referenced longitudinal velocity error; and dVy is aircraft body referenced lateral velocity error.

Thereafter, the conventional control system provides the body referenced error signals via feedback paths, which may or may not contain proportional and integral paths, to drive the velocity errors to zero.

The invention is described herein as being responsive to command signals provided by a four-axis side arm controller used with a model following control system. However, the invention will work equally as well with a flight control system wherein control surface commands are provided by conventional control inputs such as a mechanical displacement control stick and pilot operated pedals. Alternatively, other combinations of mechanical, electro-mechanical and electronic control may be used. It is also anticipated that the invention would be equally applicable to remotely piloted vehicles.

Although the centrifugal acceleration term (on lines 550 and 560 of FIG. 5) are shown and described as being developed in response to commanded heading rate, it is expected that actual heading rate may also be used to develop the centrifugal acceleration terms. However, it may be desirable when using actual heading rate to provide filtering to reduce the effects of wind gusts and external forces on measured heading rate.

Although the invention has been described and illustrated with respect to exemplary embodiments thereof, it should be understood by those skilled in the art that the foregoing and various other changes, omissions and additions may be made therein and thereto without departing from the spirit and scope of the present invention.

We claim:

1. An aircraft flight control system for providing control surface command signals to the aircraft control surfaces thereby controlling the yaw, pitch, roll and lift attitude axes of the aircraft in flight, comprising:

velocity stabilization means for providing a velocity stabilization signal in response to the activation of a velocity stabilization mode; and velocity command means responsive to the presence of said velocity stabilization signal for maintaining a constant aircraft velocity with respect to an inertial reference.

2. An aircraft flight control system according to claim 1 wherein said velocity command means further comprises:

means for providing reference signals corresponding to a desired constant aircraft velocity with respect to an inertial reference;

means for providing inertial velocity signals indicative of aircraft velocity with respect to said inertial reference;

means responsive to said reference signals and said inertial velocity signals for providing inertial velocity error signals indicative of the difference there between; and said flight control system providing control surface command signals to drive the magnitude of said inertial velocity error signals to zero when said velocity stabilization signal is present.

3. An aircraft flight control system according to claim 1 wherein said velocity command means further comprises:

means for providing reference signals corresponding to a desired constant aircraft velocity with respect to an inertial reference;

means for providing aircraft velocity signals indicative of aircraft velocity with respect to an aircraft frame of reference;

means for converting said aircraft velocity signals to inertial velocity signals indicative of aircraft velocity with respect to said inertial reference;

means responsive to said reference signals and said inertial velocity signals for providing inertial velocity error signals indicative of the difference there between;

means for converting said inertial velocity error signals to aircraft velocity error signals indicative of the required change in aircraft velocity for the aircraft to operate at said constant velocity with respect to an inertial reference; and said flight control system providing control surface command signals to drive the magnitude of said aircraft velocity error signals to zero when said velocity stabilization signal is present.

4. An aircraft flight control system according to claim 1 wherein said velocity command means further comprises:

velocity error means for providing velocity error signals for the pitch axis and the roll axis indicative of the aircraft attitude rate of change for the pitch axis and the roll axis, respectively, required to maintain said constant aircraft velocity with respect to an inertial reference; and said flight control system being responsive to the presence of said velocity stabilization signal for providing control surface command signals to drive the magnitude of said velocity error signals to zero.

5. An aircraft flight control system according to claim 4 wherein said means for providing velocity error signals further comprises:

control means operable by a pilot to provide axis command signals for controlling the yaw, pitch, roll and lift attitude axes of the aircraft;

means responsive to said axis command signals for providing corresponding desired attitude signals indicative of a desired aircraft attitude in the yaw, pitch, roll and lift attitude axes;

means responsive to said axis command signals for providing corresponding desired rate signals indicative of a desired aircraft attitude rate of change in the yaw, pitch, roll and lift attitude axes;

velocity command means responsive to said desired attitude signals for the aircraft pitch axis and roll axis and said desired rate signal for the aircraft yaw axis for providing desired pitch and roll axis velocity command signals corresponding to the aircraft body referenced velocity required to maintain said desired aircraft velocity with respect to an inertial reference;

means for providing actual aircraft pitch and roll axis velocity signals indicative of actual aircraft body referenced velocity; and said velocity error means providing said pitch axis velocity error signals as the difference between said pitch axis velocity command signals and said actual aircraft pitch axis velocity signals and providing said roll axis velocity error signals as the difference between said roll axis velocity command signals and said actual aircraft roll axis velocity signals.

6. An aircraft flight control system according to claim 5 wherein said velocity command means further comprises:

means responsive to said desired attitude signals for the aircraft pitch axis and roll axis for providing pitch and roll axis acceleration command signals;

means for providing a longitudinal centrifugal acceleration signal as the product of said roll axis velocity command signal and said desired rate signal for the aircraft yaw axis;

means for providing a lateral centrifugal acceleration signal as the product of said pitch axis velocity command signal and said desired rate signal for the aircraft yaw axis;

means for providing said pitch axis velocity command signal as the integral of the sum of said pitch axis acceleration command signal and said longitudinal centrifugal acceleration signal; and means for providing said roll axis velocity command signal as the integral of the sum of said roll axis acceleration command signal and said lateral centrifugal acceleration signal.

7. An aircraft flight control system according to claim 1 wherein said velocity command means comprises:

means for providing a longitudinal and lateral axis acceleration command signal indicative of a commanded acceleration with respect to a longitudinal axis and a lateral axis of the aircraft, respectively;

means for providing a longitudinal and a lateral centrifugal acceleration signal indicative of a centrifugal acceleration in said longitudinal axis and said lateral axis, respectively;

means for providing a longitudinal axis velocity command signal as the integral of the sum of said longitudinal axis acceleration command signal and said longitudinal centrifugal acceleration signal;

means for providing a lateral axis velocity command signal as the integral of the sum of said lateral axis acceleration command signal and said lateral centrifugal acceleration signal;

means for providing an aircraft longitudinal and lateral velocity signal indicative of the velocity of said aircraft in said longitudinal and lateral axes, respectively;

mean for providing longitudinal velocity error signals indicative of the difference between said longitudinal axis velocity command signals and said aircraft longitudinal velocity signals, and for providing lateral velocity error signals indicative of the difference between said lateral axis velocity command signals and said aircraft lateral velocity signals;

said flight control system providing control surface command signals to drive the magnitude of said longitudinal and lateral velocity error signals to zero when said velocity stabilization signal is present.

8. An aircraft flight control system according to claim 7 further comprising:

heading rate means for providing a heading rate signal indicative of a rate of change of aircraft heading;

said longitudinal centrifugal acceleration signal being indicative of the product of said heading rate signal and said lateral axis velocity command signal; and said lateral centrifugal acceleration signal being indicative of the product of said heading rate signal and said longitudinal axis velocity command signal.

9. An aircraft flight control system according to claim 8 wherein said heading rate signal is indicative of a desired aircraft heading rate.

10. An aircraft flight control system according to claim 8 wherein said heading rate signal is indicative of actual aircraft heading rate.

11. An aircraft flight control system according to claim 4 wherein said velocity error means further comprises:

means for providing reference signals corresponding to a desired constant aircraft velocity with respect to an inertial reference;

means for providing inertial velocity signals indicative of aircraft velocity with respect to said inertial reference;

means responsive to said reference signals and said inertial velocity signals for providing inertial velocity error signals indicative of the difference there between; and said flight control system providing control surface command signals to drive the magnitude of said inertial velocity error signals to zero when said velocity stabilization signal is present.

12. An aircraft flight control system according to claim 4 wherein said velocity error means further comprises:

means for providing reference signals corresponding to a desired constant aircraft velocity with respect to an inertial reference;

means for providing aircraft velocity signals indicative of aircraft velocity with respect to an aircraft frame of reference;

means for converting said aircraft velocity signals to inertial velocity signals indicative of aircraft velocity with respect to said inertial reference;

means responsive to said reference signals and said inertial velocity signals for providing inertial velocity error signals indicative of the difference there between;

means for converting said inertial velocity error signals to aircraft velocity error signals indicative of the required change in aircraft velocity for the aircraft to operate at said constant velocity with respect to an inertial reference; and said flight control system providing control surface command signals to drive the magnitude of said aircraft velocity error signals to zero when said velocity stabilization signal is present.

* * * * *